(12) United States Patent
Satou et al.

(10) Patent No.: US 10,516,313 B2
(45) Date of Patent: Dec. 24, 2019

(54) INSULATOR FOR ARMATURE, MOTOR

(71) Applicant: DAIKIN INDUSTRIES, LTD., Osaka-shi, Osaka (JP)

(72) Inventors: Junichi Satou, Osaka (JP); Motofumi Ohtsuji, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/345,922

(22) PCT Filed: Oct. 25, 2017

(86) PCT No.: PCT/JP2017/038479
§ 371 (c)(1),
(2) Date: Apr. 29, 2019

(87) PCT Pub. No.: WO2018/079587
PCT Pub. Date: May 3, 2018

(65) Prior Publication Data
US 2019/0296598 A1 Sep. 26, 2019

(30) Foreign Application Priority Data
Oct. 31, 2016 (JP) ................................ 2016-212584

(51) Int. Cl.
*H02K 3/18* (2006.01)
*H02K 3/38* (2006.01)
*H02K 3/52* (2006.01)

(52) U.S. Cl.
CPC .............. *H02K 3/38* (2013.01); *H02K 3/522* (2013.01); *H02K 2203/09* (2013.01)

(58) Field of Classification Search
CPC .. H02K 3/18; H02K 3/34; H02K 3/38; H02K 5/22
See application file for complete search history.

(56) References Cited

U.S. PATENT DOCUMENTS

| 5,900,687 A * | 5/1999 | Kondo ................... H02K 3/522 |
| | | 310/260 |
| 6,600,244 B2 * | 7/2003 | Okazaki ................ H02K 3/522 |
| | | 310/71 |
| 8,502,432 B2 | 8/2013 | Urano et al. |
| 2013/0234549 A1 | 9/2013 | Egami et al. |
| 2013/0257183 A1 | 10/2013 | Yokogawa |

(Continued)

FOREIGN PATENT DOCUMENTS

| CN | 101689778 B | 11/2011 |
| JP | 55-19809 A | 2/1980 |
| JP | 2004-153973 A | 5/2004 |

(Continued)

OTHER PUBLICATIONS

International Search Report for PCT/JP2017/038479 (PCT/ISA/210) dated Jan. 23, 2018.

*Primary Examiner* — Dang D Le
(74) *Attorney, Agent, or Firm* — Birch, Stewart, Kolasch & Birch, LLP

(57) ABSTRACT

An insulator for an armature has holes and guide portions. The holes are penetrated by pins. The pins are connected to one ends of corresponding coils, respectively. The guide portions respectively guide the jumper lines in a circumferential direction with respect to an axis.

17 Claims, 12 Drawing Sheets

(56) References Cited

U.S. PATENT DOCUMENTS

2017/0155296 A1    6/2017   Nakamasu et al.

FOREIGN PATENT DOCUMENTS

| JP | 2008-148533 A | 6/2008 |
| JP | 2013-215025 A | 10/2013 |
| JP | 2013-220024 A | 10/2013 |
| JP | 2016-27781 A | 2/2016 |

\* cited by examiner

F I G. 1
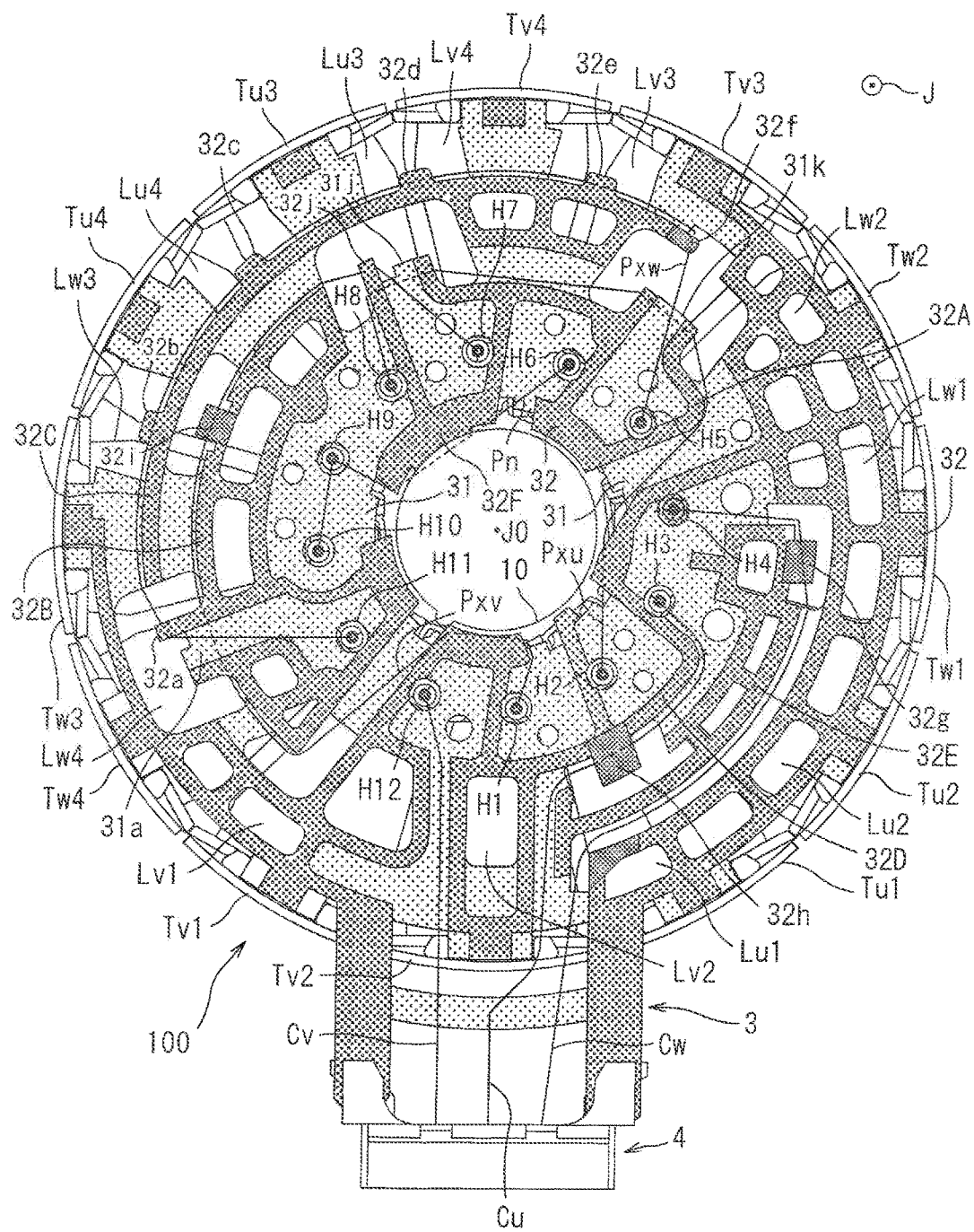

F I G. 5
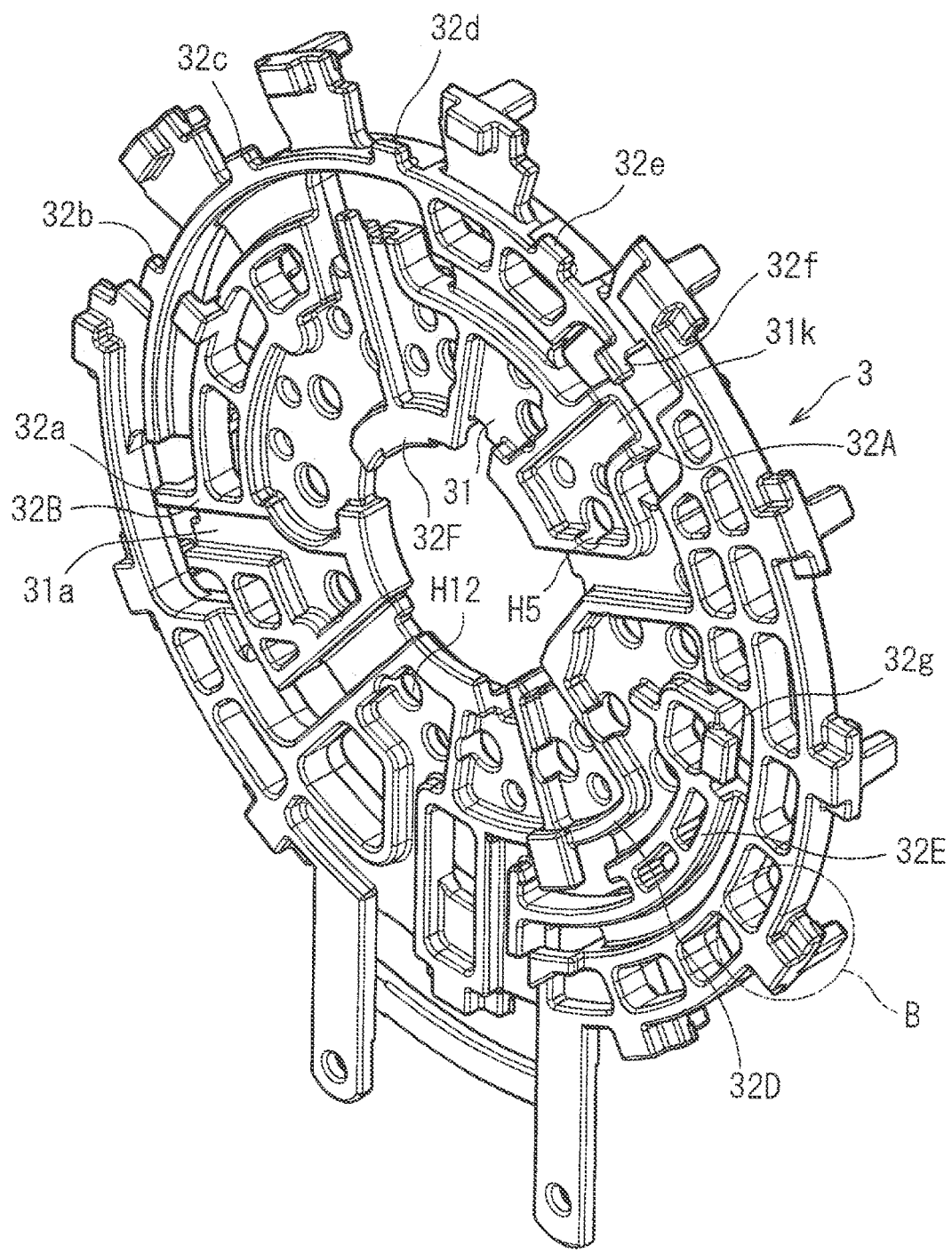

F I G . 1 1
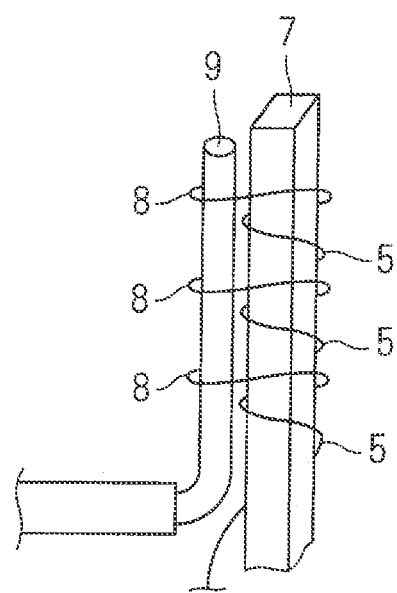

INSULATOR FOR ARMATURE, MOTOR

TECHNICAL FIELD

The present invention relates to an insulator used for an armature.

BACKGROUND ART

For example, as disclosed in the following Japanese Patent Application Laid-Open No. 2016-27781, there is a technique in which, in an armature provided with a plurality of armature windings (hereinafter also referred to as "coils") which are annularly arranged, pins are correspondingly provided for the coils. This configuration is provided because an end of one of a pair of coils arranged adjacent to each other and an end of the other coil are connected to each other. In Japanese Patent Application Laid-Open No. 2016-27781, such a connection is achieved by winding a pair of coils with a continuous wire.

FIG. 12 is a connection diagram which shows connection of three-phase coils in a 12-pole armature and which is disclosed in, for example, Japanese Patent Application Laid-Open No. 2016-27781. In FIG. 12, a coil pair Lua has coils Lu1 and Lu2 connected in series with each other, and the coils Lu1 and Lu2 are disposed adjacent to each other in the armature. Similarly, a coil pair Lub has coils Lu3 and Lu4, a coil pair Lva has coils Lv1 and Lv2, a coil pair Lvb has coils Lv3 and Lv4, a coil pair Lwa has coils Lw1 and Lw2, and a coil pair Lwb has coils Lw3 and Lw4.

The connection of a pair of coils inside these coil pairs is achieved by a continuous wire as described above. However, a connection between the coil pairs (a so-called "jumper line") needs to be interposed by pins. This is because the coil pair Lua and the coil pair Lub which are connected in series are arranged apart from each other by 180 degrees. The same applies to a jumper line between the coil pairs Lva and Lvb and a jumper line between the coil pairs Lwa and Lwb.

In order to achieve such a connection between the coil pairs, Japanese Patent Application Laid-Open No. 2016-27781 uses a printed circuit board. The printed circuit board is provided with lands to which the pins connected to the ends of the coils are connected, and the lands are connected to each other with a wiring pattern on the printed circuit board. In this way, in the related art, the jumper line is achieved by the pins and the wiring pattern on the printed circuit board.

SUMMARY

Problem to be Solved by the Invention

However, solder necessary for electrically connecting the lands and the pins is also required to have mechanical strength to fix the printed circuit board to the pins. In other words, if the solder is damaged by an external force applied between the printed circuit board and the pins, the electrical connection may also be impaired due to such damage.

It is therefore an object of the present invention to provide a technique for arranging a jumper line without increasing an axial dimension of the armature and without using a printed circuit board.

Means to Solve the Problem

An insulator (3) for an armature (100) in which a plurality of coils (Lu1 to Lu4, Lv1 to Lv4, Lw1 to Lw4) are annularly arranged and one ends of the coils are connected to pins which respectively correspond to the coils, the insulator (3) being an insulator which is provided so as to align with the coils in an axial direction (J) parallel to an axis (J0) of the armature and which guides three or more jumper lines (Pxu, Pxv, Pxw, Pn) that connect the coils with each other in a circumferential direction with respect to the axis.

According to a first aspect of the present invention, the insulator has a plurality of holes (H1 to H12) that are penetrated by the pins in the axial direction, and a plurality of first guide portions (32F, 32A, 32C; 32F, 32B, 32C) that guide at least three (Pn, Pxu, Pxw; Pn, Pxv, Pxw) of the jumper lines in the circumferential direction with respect to the axis at different positions in a radial direction around the axis.

According to a second aspect of the present invention, the insulator for an armature according to the first aspect is interposed between the coils and connection portions between the jumper lines and the pins in the axial direction.

According to a third aspect of the present invention, in the insulator for an armature according to the second aspect, at least one of the first guide portions has at least one protrusion ($31j$, $31k$, $32a$ to $32f$; $31a$, $32a$ to $32f$, $32i$, $32j$) protruding toward an outer periphery along the radial direction.

According to a fourth aspect of the present invention, in the insulator for an armature according to any one of the first to third aspects, at least one of the pins functions as a power supply pin to which one end of a power supply line (Cu, Cw) is connected together with the one end of one of the coils. The insulator for an armature further includes at least one second guide portion (32D, 32E) for guiding the power supply line in the circumferential direction.

According to a fifth aspect of the present invention, in the insulator for an armature according to the fourth aspect, the second guide portion has at least one protrusion ($32g$, $32h$) protruding toward the outer periphery along the radial direction.

According to a sixth aspect of the present invention, in the insulator for an armature according to the fourth or fifth aspect, the one end of the power supply line and the one end of one of the coils are targets to be bound to the power supply pin with another wire, at the power supply pin. The insulator for an armature is interposed between the binding position and the coil in the axial direction.

According to a seventh aspect of the present invention, in the insulator for an armature according to any one of the first to sixth aspects, one of the coils is wound around a second insulator (6). The insulator for an armature further includes an engagement part (39) to be engaged with the second insulator. The insulator for an armature is fixed to the second insulator in the axial direction by engagement between the second insulator and the engagement part in the axial direction.

Effects of the Invention

The insulator for an armature according to the first aspect of the present invention eliminates a need to use a printed circuit board for connection, and guides jumper lines without an increase in an axial dimension. Moreover, even if an external force is applied to the insulator for an armature, the connection between the coils is prevented from being impaired.

The insulator for an armature according to the second aspect of the present invention increases an insulation distance from the coils in many areas of the jumper lines.

The insulator for an armature according to the third aspect of the present invention inhibits the jumper lines from moving away from the coils.

The insulator for an armature according to the fourth aspect of the present invention eliminates a need to use a printed circuit board for connection, and guides the power supply line without an increase in an axial dimension.

The insulator for an armature according to the fifth aspect of the present invention inhibits the power supply line from moving away from the coils.

The insulator for an armature according to the sixth aspect of the present invention makes it easy to connect one end of the power supply line and one end of the coil.

The insulator for an armature according to the seventh aspect of the present invention is highly effective in preventing the connection between the coils from being impaired even if an external force is applied to the insulator for an armature.

The objects, features, aspects, and advantages of the present invention will become more apparent from the following detailed description and the accompanying drawings.

BRIEF DESCRIPTION OF DRAWINGS

FIG. 1 is a plan view showing an armature employing an insulator for an armature according to a first embodiment;

FIG. 5 is a perspective view of the insulator for an armature;

FIG. 11 is a schematic diagram showing a mode for connecting a wire and a power supply line to a pin.

DESCRIPTION OF EMBODIMENTS

First Embodiment

FIG. 1 is a plan view showing an armature 100 employing an insulator 3 for an armature according to the first embodiment, as viewed along an axial direction J parallel to an axis J0 of the armature. The armature 100 has an inner edge 10 around the axis J0.

A plurality of coils Lu1 to Lu4, Lv1 to Lv4, and Lw1 to Lw4 are annularly arranged. These coils are concentratedly wound around teeth Tu1 to Tu4, Tv1 to Tv4, and Tw1 to Tw4, respectively. The coils Lu1, Lu2, Lw1, Lw2, Lv3, Lv4, Lu3, Lu4, Lw3, Lw4, Lv1, and Lv2 are arranged counter-clockwise in this order. Note that, in FIG. 1, the wire constituting each coil is schematically shown as a unit.

<Connection Relationship Between Coils>

These twelve coils are divided into six sets of coil pairs, each of which consists of a pair of coils adjacent to each other annularly. More specifically, the coils Lu1 and Lu2 form a coil pair Lua, the coils Lw1 and Lw2 form a coil pair Lwa, the coils Lv3 and Lv4 form a coil pair Lvb, the coils Lu3 and Lu4 form a coil pair Lub, the coils Lw3 and Lw4 form a coil pair Lwb, and the coils Lv1 and Lv2 form a coil pair Lva (see also FIG. 12).

Figure 12:
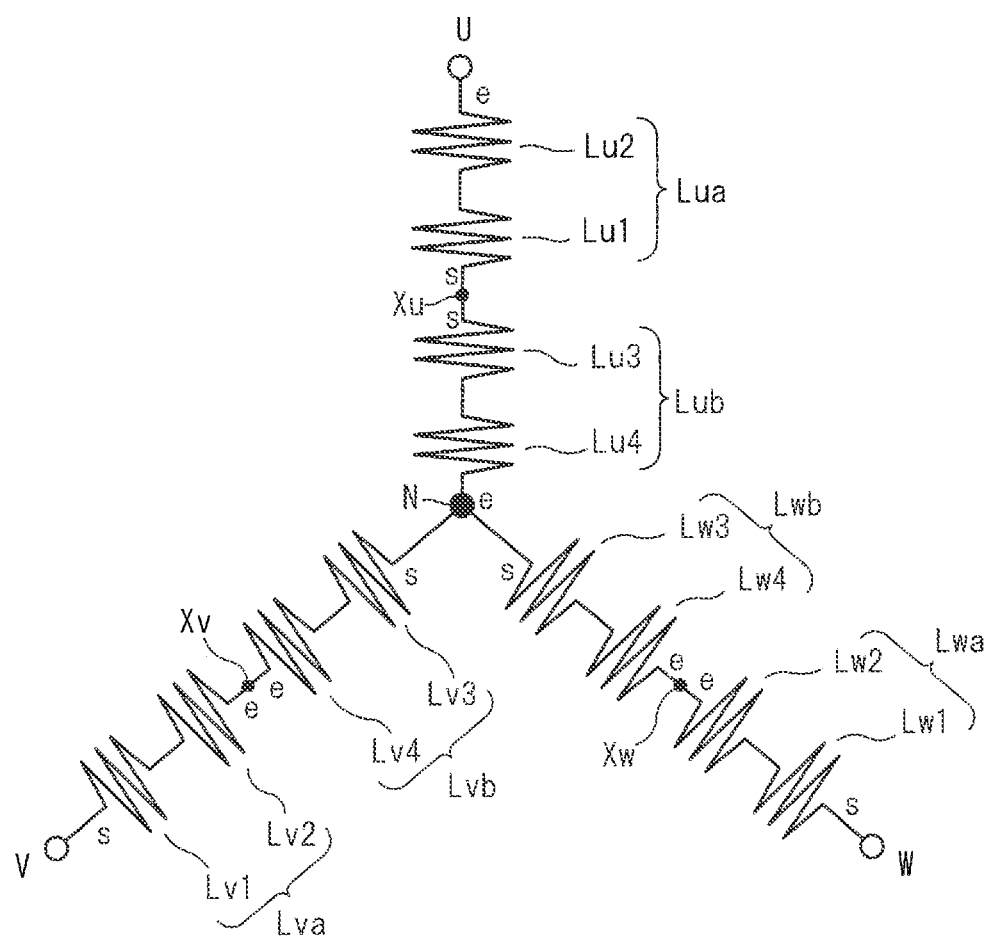
FIG. 12 is a connection diagram showing connection of three-phase coils.

These coils are connected in the manner shown in the connection diagram in FIG. 12. In FIG. 12, symbols "s" and "e" attached to each of the coil pairs respectively indicate a winding-start-side end and a winding-end-side end of the wire continuously forming each coil pair.

The coil pairs Lua and Lub are connected to each other such that the winding-start-side ends of the wires constituting the respective coil pairs are connected to each other at a connection point Xu. That is, the coils Lu1 and Lu3 are connected at the connection point Xu. As a result, the coils Lu2, Lu1, Lu3, and Lu4 are connected in series in this order. The coil pairs Lva and Lvb are connected to each other such that the winding-end-side ends of the wires constituting the respective coil pairs are connected to each other at a connection point Xv. That is, the coils Lv2 and Lv4 are connected at the connection point Xv. As a result, the coils Lv1, Lv2, Lv4, and Lv3 are connected in series in this order. The coil pairs Lwa and Lwb are connected to each other such that the winding-end-side ends of the wires constituting the respective coil pairs are connected to each other at a connection point Xw. That is, the coils Lw2 and Lw4 are connected at the connection point Xw. As a result, the coils Lw1, Lw2, Lw4, and Lw3 are connected in series in this order.

The winding-end-side end of the wire constituting the coil pair Lub, the winding-start-side end of the wire constituting the coil pair Lvb, and the winding-start-side end of the wire constituting the coil pair Lwb are connected at a neutral point N. That is, the coils Lu4, Lv3, and Lw3 are connected at the neutral point N. The connection points Xu, Xv, and Xw and the neutral point N in the connection diagram are achieved by jumper lines Pxu, Pxv, and Pxw in the actual armature, as shown in FIG. 1.

When a U-phase current is supplied to the winding-end-side end of the wire constituting the coil pair Lua, a V-phase current is supplied to the winding-start-side end of the wire constituting the coil pair Lva, and a W-phase current is supplied to the winding-start-side end of the wire constituting the coil pair Lwa, the teeth Tu1 to Tu4, Tv1 to Tv4, and Tw1 to Tw4 generate a rotating magnetic field directed toward the outer circumferential side of these teeth (outwardly along the radial direction around the axis J0) (see Japanese Patent Application Laid-Open No. 2016-27781). That is, the coils Lu1 to Lu4, Lv1 to Lv4, and Lw1 to Lw4 constitute an armature used for an outer rotor motor.

<Relationship Between Pins and Holes>

The insulator 3 for an armature is provided so as to align with the coils Lu1 to Lu4, Lv1 to Lv4, and Lw1 to Lw4 in the axial direction J. With reference to FIG. 1, the insulator 3 for an armature is provided on the front side of the paper to the coils Lu1 to Lu4, Lv1 to Lv4, and Lw1 to Lw4.

Figure 2:
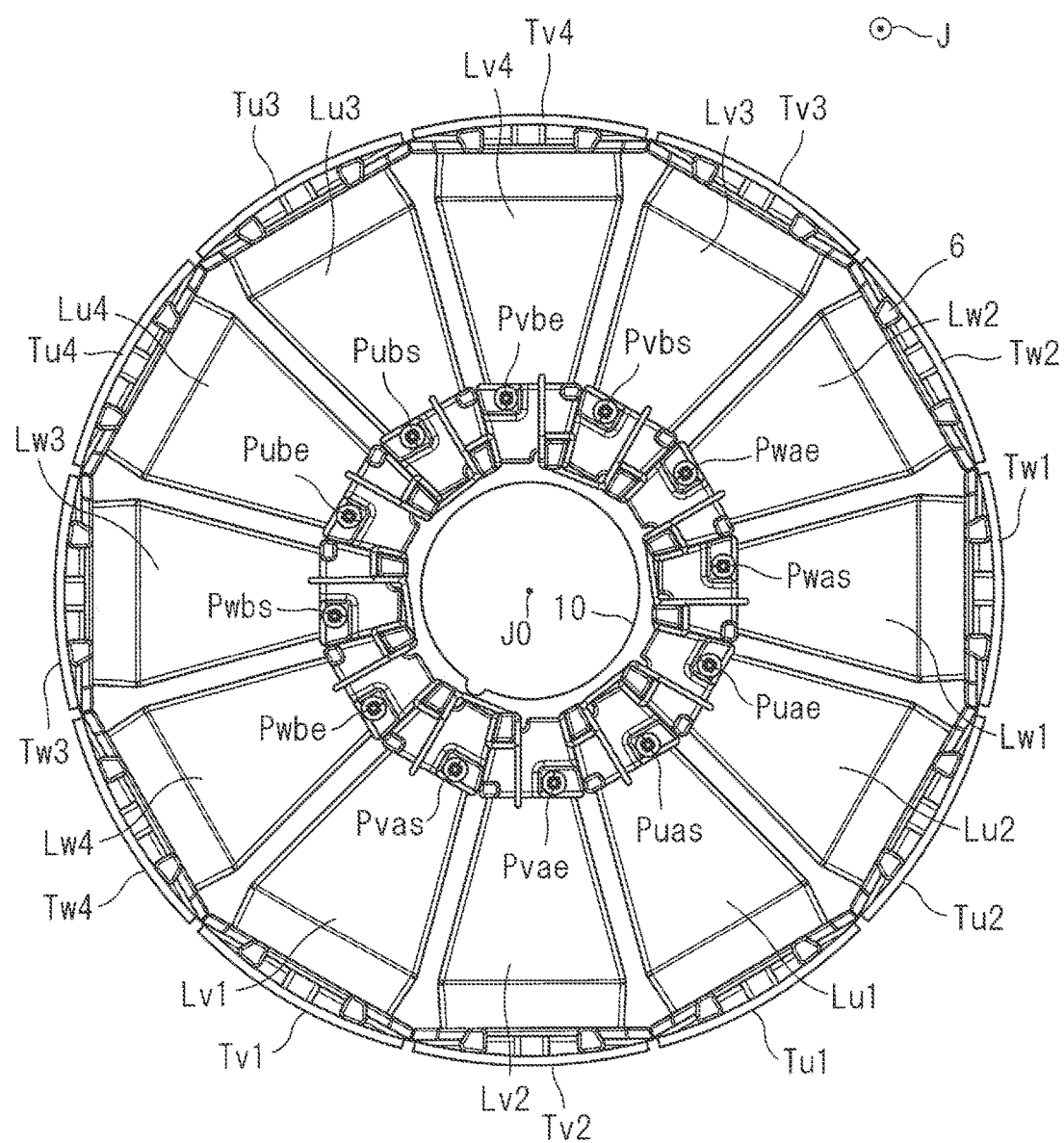
FIG. 2 is a plan view showing an armature from which the insulator for an armature is removed.

FIG. 2 is a plan view showing a state where the insulator 3 for an armature is removed from the armature shown in FIG. 1. It is to be noted that FIG. 2 also shows lines indicating bent parts and chamfered parts which are not shown in FIG. 1 for avoiding complexity. In the coils Lu1 to Lu4, Lv1 to Lv4 and Lw1 to Lw4, the portions where the outer shapes are bent are indicated by double lines, and the double lines do not represent wires.

Pins Puas, Puae, Pwas, Pwae, Pvbs, Pvbe, Pubs, Pube, Pwbs, Pwbe, Pvas, and Pvae are connected to the ends of corresponding coils Lu1, Lu2, Lw1, Lw2, Lv3, Lv4, Lu3, Lu4, Lw3, Lw4, Lv1, and Lv2. More specifically, the winding-start-side end of the wire constituting the coil pair Lua is connected to the pin Puas, the winding-end-side end of the wire constituting the coil pair Lua is connected to the pin Puae, the winding-start-side end of the wire constituting the coil pair Lub is connected to the pin Pubs, the winding-end-side end of the wire constituting the coil pair Lub is connected to the pin Pube, the winding-start-side end of the wire constituting the coil pair Lva is connected to the pin Pas, the winding-end-side end of the wire constituting the coil pair Lva is connected to the pin Pvae, the winding-start-side end of the wire constituting the coil pair Lvb is connected to the pin Pvbs, the winding-end-side end of the wire constituting the coil pair Lvb is connected to the pin Pvbe, the winding-start-side end of the wire constituting the coil pair Lwa is connected to the pin Pwas, the winding-end-side end of the wire constituting the coil pair Lwa is connected to the pin Pwae, the winding-start-side end of the wire constituting the coil pair Lwb is connected to the pin Pwbs, and the winding-end-side end of the wire constituting the coil pair Lwb is connected to the pin Pwbe.

The wires and the pins are specifically connected by soldering. Note that, in order to make it easy to secure electrical conduction, it is desirable that a composition of the pin around which the wire is wound is soldered.

<Position of Jumper Line>

The description will be continued, returning back to FIG. 1. The insulator 3 for an armature has a plurality of holes H1 to H12 which are respectively penetrated by the pins Puas, Puae, Pwas, Pwae, Pvbs, Pvbe, Pubs, Pube, Pwbs, Pwbe, Pvas, and Pvae in the axial direction J.

In order to achieve the connection point Xu with the jumper line Pxu, the jumper line Pxu is laid between the holes H2 and H8 which are penetrated by the pins Puas and Pubs, respectively. In order to achieve the connection point Xv with the jumper line Pxv, the jumper line Pxv is laid between the holes H1 and H7 which are penetrated by the pins Pvae and Pvbe, respectively. In order to achieve the connection point Xw with the jumper line Pxw, the jumper line Pxw is laid between the holes H5 and H11 which are penetrated by the pins Pwae and Pwbe pass, respectively. In order to achieve the neutral point N with the jumper line Pn, the jumper line Pn is laid between the holes H9, H6 and H10 which are penetrated by the pins Pube, Pvbs and Pwbs, respectively.

At least three of these jumper lines Pn, Pxu, Pxv, and Pxw are guided in the circumferential direction at different positions in the radial direction around the axis. More specifically, the insulator 3 for an armature includes a guide portion 32A for guiding the jumper line Pxu, a guide portion 32B for guiding the jumper line Pxv, a guide portion 32C for guiding the jumper line Pxw, and a guide portion 32F for guiding the jumper line Pn.

The insulator 3 for an armature has a base 31 and a protruding portion 32 that protrudes from the base 31 toward the front side of the paper (that is, toward the side opposite to the coils Lu1 to Lu4, Lv1 to Lv4, and Lw1 to Lw4 in the axial direction J). In FIG. 1, the base 31 is shown by coarse dots, and the protruding portion 32 is shown by two types of fine dots. The part shown by finer dots of the two types of fine dots indicates an area (described in detail later) of the protruding portion 32 protruding further toward the front side of the paper.

In the jumper lines Pn, Pxu, Pxv, and Pxw, portions which are laid on the side of coils Lu1 to Lu4, Lv1 to Lv4, and Lw1 to Lw4 with respect to the insulator 3 for an armature are shown by broken lines, regardless of whether or not they are hidden lines.

Many portions of the jumper lines Pn, Pxu, Pxv, and Pxw are laid on the side opposite to the coils Lu1 to Lu4, Lv1 to Lv4, and Lw1 to Lw4 with respect to the insulator 3 for an armature. Therefore, connection portions between the jumper line Pxu and the pins Puas and Pubs, connection portions between the jumper line Pxv and the pins Pvae and Pvbe, and connection portions between the jumper line Pxw and the pins Pwae and Pwbe are all located on the side opposite to the coils Lu1 to Lu4, Lv1 to Lv4, and Lw1 to Lw4 with respect to the insulator 3 for an armature. In other words, the insulator 3 for an armature is interposed between these connection portions and the coils Lu1 to Lu4, Lv1 to Lv4 and Lw1 to Lw4 in the axial direction J. Such interposition is desirable from the viewpoint of increasing an insulation distance from the coils Lu1 to Lu4, Lv1 to Lv4, and Lw1 to Lw4 in many portions of the jumper lines Pn, Pxu, Pxv, and Pxw.

<Guide Portion 32A>

The guide portion 32A has the protruding portion 32 protruding from the base 31 on a hole H4 side with respect to the hole H5. By being guided by this portion, the jumper line Pxu which extends from the hole H2 through an area between the holes H4 and H5 toward the outer periphery and then is bent counterclockwise in the circumferential direction.

The guide portion 32A has the protruding portion 32 protruding from the base 31 on a hole H7 side with respect to the hole H8. By being guided by this portion, the jumper line Pxu which extends from the hole H8 toward the outer periphery and then is bent clockwise in the circumferential direction. This portion also has a protrusion 32j protruding toward the outer periphery.

As shown in FIG. 1, the guide portion 32A may have the protruding portion 32 protruding from the base 31 on the outer peripheral side with respect to the holes H6 and H7. This portion guides the jumper line Pxu to the outer peripheral side with respect to the holes H5 to H8. However, in order to lay the jumper lines Pxw and Pxv on the base 31 side with respect to the protruding portion 32, there are regions where the protruding portion 32 is not provided (regions where protrusions 31k and 31j protruding toward the outer periphery is exposed in the base 31) on the outer peripheral side between the holes H5 and H6 and on the outer peripheral side between the holes H7 and H8.

In FIG. 1, the jumper line Pxu is laid on the side of the coils Lu3 and Lv3 with respect to the protrusions 31j and 31k. The protrusions 31j and 31k inhibit the jumper line Pxu from moving away from the coils Lu3 and Lv3. Such inhibition is desirable from the viewpoint of preventing the jumper line Pxu from being disengaged from the guide portion 32A.

In addition, the protrusion 32j is desirable from the viewpoint of preventing the jumper line Pxv from being disengaged from a guide portion 32B described later.

<Guide Portion 32B>

The guide portion 32B has the protruding portion 32 protruding from the base 31 on a hole H12 side with respect to the hole H11. By being guided by this portion, the jumper line Pxv extends from the inner peripheral side toward the outer peripheral side between the holes H11 and H12 and then is bent clockwise in the circumferential direction.

The guide portion 32B has the protruding portion 32 protruding from the base 31 on the outer peripheral side with respect to the holes H8 to H11. This portion guides the jumper line Pxv to the outer peripheral side with respect to the holes H8 to H11. However, in order to lay the jumper lines Pxu and Pxw on the base 31 side with respect to the protruding portion 32, there are regions where the protruding portion 32 is not provided on the outer peripheral side with respect to the hole H8 and on the outer peripheral side between the holes H10 and H11 (regions where a protrusion 31a protruding toward the outer periphery is exposed in the base 31).

In FIG. 1, the jumper line Pxv is laid on the coil Lw4 side with respect to the protrusion 31a. The protrusion 31a inhibits the jumper line Pxv from moving away from the coil Lw4. Such inhibition is desirable from the viewpoint of preventing the jumper line Pxv from being disengaged from the guide portion 32B.

Similar inhibition is achieved by a protrusion 32i which is a part of the protruding portion 32 and which protrudes toward the front side of the paper and toward the outer periphery on the outer peripheral side with respect to the hole H9. The protrusion 32i can also be regarded as the guide portion 32B. The jumper line Pxv is laid on the coil Lu4 side with respect to the protrusion 32i and the movement of the jumper line Pxv in a direction away from the coil Lu4 is inhibited.

The guide portion 32B has a protrusion 32a protruding toward the outer periphery on the outer peripheral side between the holes H10 and H11. The protrusion 32a is desirable from the viewpoint of preventing the jumper line Pxw from being disengaged from a guide portion 32C described later.

<Guide Portion 32C>

The guide portion 32C has the protruding portion 32 protruding from the base 31 on the outer peripheral side with respect to the holes H6 to H10 and on the outer peripheral side with respect to the guide portions 32A and 32B. This portion guides the jumper line Pxw to the outer peripheral side with respect to the holes H6 to H10.

The guide portion 32C has a protrusion 32b formed near the outer peripheral side with respect to the hole H9 so as to protrude toward the outer periphery, a protrusion 32c formed near the outer peripheral side with respect to the hole H8 so as to protrude toward the outer periphery, a protrusion 32d formed near the outer peripheral side with respect to the hole H7 so as to protrude toward the outer periphery, and a protrusion 32e formed near the outer peripheral side with respect to the hole H6 so as to protrude toward the outer periphery.

The jumper line Pxw is laid on the side of the coils Lw3 and Lu4 with respect to the protrusion 32b, on the side of the coils Lu4 and Lu3 with respect to the protrusion 32c, on the side of the coils Lu3 and Lv4 with respect to the protrusion 32d, and on the side of the coils Lv3 and Lv4 with respect to the protrusion 32e, respectively. The protrusions 32b to 32e inhibit the jumper line Pxw from moving away from the coils Lw3, Lu4, Lu3, Lv4, and Lv3. Such inhibition is desirable from the viewpoint of preventing the jumper line Pxw from being disengaged from the guide portion 32C.

Similar inhibition is achieved by a protrusion 32f which is a part of the protruding portion 32 and which protrudes toward the front side of the paper and in the circumferential direction on the outer peripheral side with respect to the hole H6. The protrusion 32f can also be regarded as the guide portion 32C. The jumper line Pxw is laid on the coil Lv3 side with respect to the protrusion 32f and the movement of the jumper line Pxw in a direction away from the coil Lv3 is inhibited.

The protrusion 32f also has a function to switch the laying direction of (a function to bend) the jumper line Pxw between the radial direction and the circumferential direction in a region between the hole H5 and the protrusion 32e.

<Guide Portion 32F>

The guide portion 32F has the protruding portion 32 protruding from the base 31 on the inner peripheral side with respect to the holes H7 to H9. This portion guides the jumper line Pn on the coils Lu3, Lv3, and Lu4 side with respect to the base 31 on the inner peripheral side with respect to the holes H7 to H9.

From the above, the jumper lines Pn, Pxu, and Pxw are guided in the circumferential direction at radially different positions by the guide portions 32F, 32A, and 32C, respectively. Specifically, the jumper line Pn is guided in the circumferential direction on the inner peripheral side with respect to the jumper line Pxu, and the jumper line Pxw is guided in the circumferential direction on the outer peripheral side with respect to the jumper line Pxu.

Further, the jumper lines Pn, Pxv, and Pxw are guided in the circumferential direction at radially different positions by the guide portions 32F, 32B, and 32C, respectively. Specifically, the jumper line Pn is guided in the circumferential direction on the inner peripheral side with respect to the jumper line Pxv, and the jumper line Pxw is guided in the circumferential direction on the outer peripheral side with respect to the jumper line Pxv.

The guide portions 32A, 32B, 32C, and 32F respectively guide the jumper lines Pxu, Pxv, Pxw, and Pn in this way. Therefore, when the insulator 3 for an armature is used in place of a printed circuit board, the jumper lines are guided without an increase in the axial dimension. Moreover, the holes H1 to H12 are not the targets to be soldered as the lands on the printed circuit board are, and thus, even if an external force is applied, the connection between the coils is not impaired. Also, the amount of solder required for soldering is smaller than that in the case of using a printed circuit board.

<Laying of Power Supply Lines>

A power supply line Cu is connected to the pin Puae for supplying a U-phase current. A power supply line Cv is connected to the pin Pvas for supplying a V-phase current. A power supply line Cw is connected to the pin Pwas for supplying a W-phase current. That is, the pins Puae, Pvas, and Pwas function as power supply pins to which not only the ends of the coils Lu2, Lv1, and Lw1 but also one ends of the power supply lines Cu, Cv, and Cw are connected. An example of connection at the power supply pin will be described in detail in another embodiment.

A connector 4 introduces the power supply lines Cu, Cv, and Cw from outside the insulator 3 for an armature. Pins Puae, Pvas, and Pwas pass through the holes H3, 1112, and H4, respectively. Therefore, in the insulator 3 for an armature, the power supply line Cu is laid from the connector 4 to the hole H3, the power supply line Cv is laid from the connector 4 to the hole H12, and the power supply line Cu is laid from the connector 4 to the hole H4. The power supply lines Cu and Cw are guided in the circumferential direction by the guide portions 32D and 32E, respectively.

<Guide Portion 32D>

The guide portion 32D has the protruding portion 32 protruding from the base 31 on the outer peripheral side with respect to the holes H1 to H3. This portion guides the power supply line Cu to the outer peripheral side with respect to the holes H1 to H3.

The guide portion 32D also has the protruding portion 32 protruding from the base 31 on the H2 side with respect to the hole H3. The power supply line Cu which extends toward the outer peripheral side as viewed from the hole H3 bends in the circumferential direction at this portion.

The guide portion 32D has a protrusion 32*h* protruding toward the front side of paper and toward the outer peripheral side, near the outer peripheral side with respect to the hole H2. The power supply line Cu is laid on the coil Lu1 side with respect to the protrusion 32*h*. The protrusion 32*h* inhibits the power supply line Cu from moving away from the coil Lu1. Such inhibition is desirable from the viewpoint of preventing the power supply line Cu from being disengaged from the guide portion 32D.

<Guide Portion 32E>

The guide portion 32E has the protruding portion 32 protruding from the base 31 on the outer peripheral side with respect to the holes H1 to H4 and on the outer peripheral side with respect to the guide portion 32D. This portion guides the power supply line Cw to the outer peripheral side with respect to the holes H1 to H4.

The guide portion 32E also has the protruding portion 32 protruding from the base 31 near the outer peripheral side with respect to the hole H4. The power supply line Cw which extends toward the outer peripheral side as viewed from the hole H4 bends in the circumferential direction at this portion.

The guide portion 32E has a protrusion 32*g* protruding toward the front side of the paper and toward the outer peripheral side near the outer peripheral side with respect to the hole H4. The power supply line Cw is laid on the coil Lw1 side with respect to the protrusion 32*g*. The protrusion 32*g* inhibits the power supply line Cw from moving away from the coil Lw1. Such inhibition is desirable from the viewpoint of preventing the power supply line Cw from being disengaged from the guide portion 32E.

From the above, the power supply lines Cu and Cw are guided in the circumferential direction at radially different positions by the guide portions 32D and 32E, respectively. Specifically, the power supply line Cu is guided in the circumferential direction on the inner peripheral side with respect to the power supply line Cw.

Therefore, when the insulator 3 for an armature is used in place of a printed circuit board, the power supply lines Cu and Cw are also guided in the circumferential direction without an increase in the axial dimension, as in the jumper lines Pn, Pxu, Pxv, and Pxw.

<Combination of Functions>

As described above, the guide portion 32A is capable of functioning to guide the jumper line Pxu in the circumferential direction, and to assist the guiding of the jumper line Pxv in the circumferential direction by the guide portion 32B due to the protrusion 32*j* of the guide portion 32A. The guide portion 32B is capable of functioning to guide the jumper line Pxv in the circumferential direction, and to assist the guiding of the jumper line Pxw in the circumferential direction by the guide portion 32C due to the protrusion 32*a* of the guide portion 32B.

Similar to the combined functions described above, the guide portion 32D may inhibit the jumper line Pxu from moving away from the coils Lu2 and Lw1 on the inner peripheral side with respect to the holes H3 and H4. The circumferential end of the guide portion 32E may guide the power supply line Cu from the connector 4 to the guide portion 32D on the outer peripheral side with respect to the hole H2.

<Modification of Shape>

Figure 3:
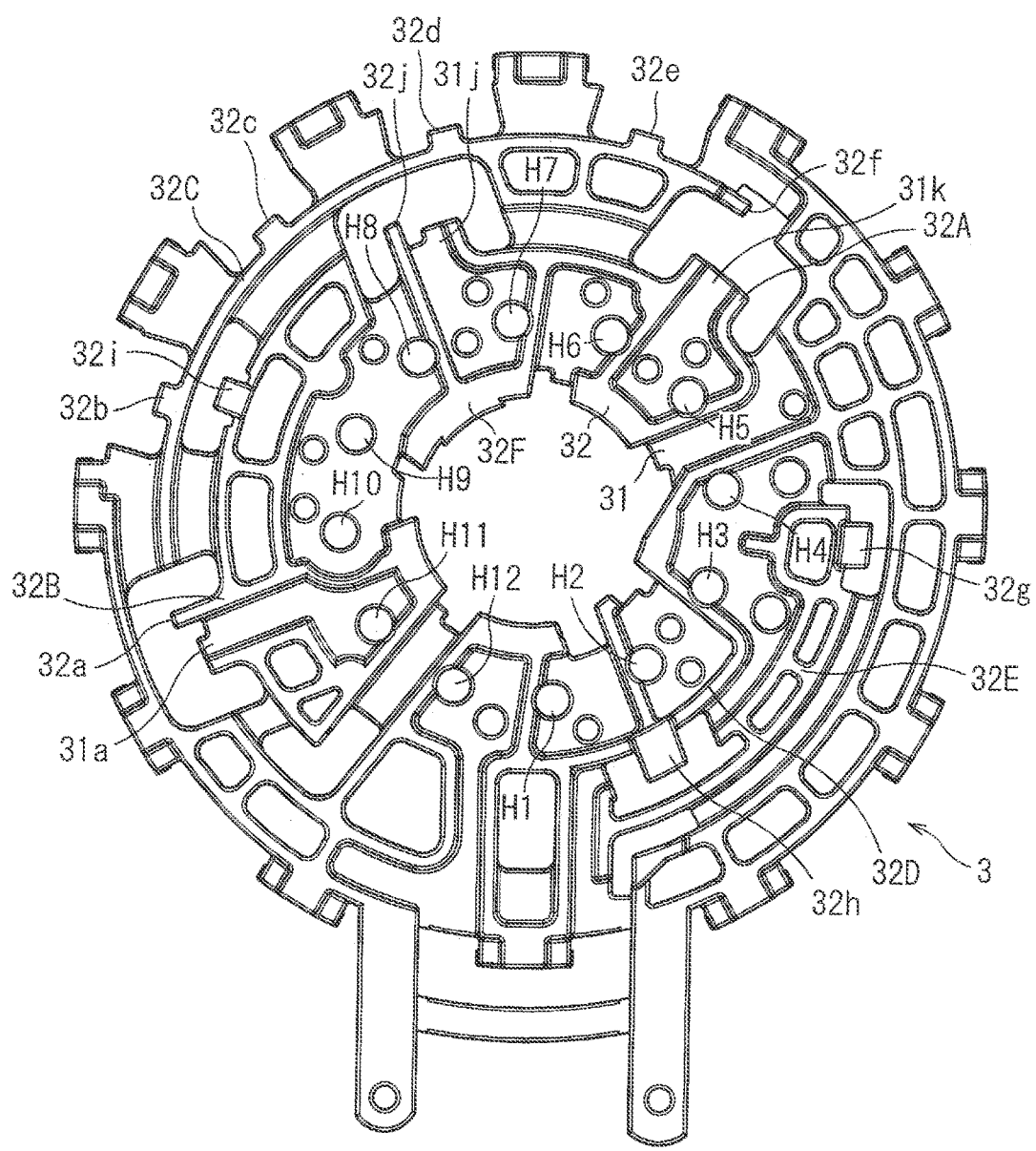
FIG. 3 is a front view of the insulator for an armature.
Figure 4:
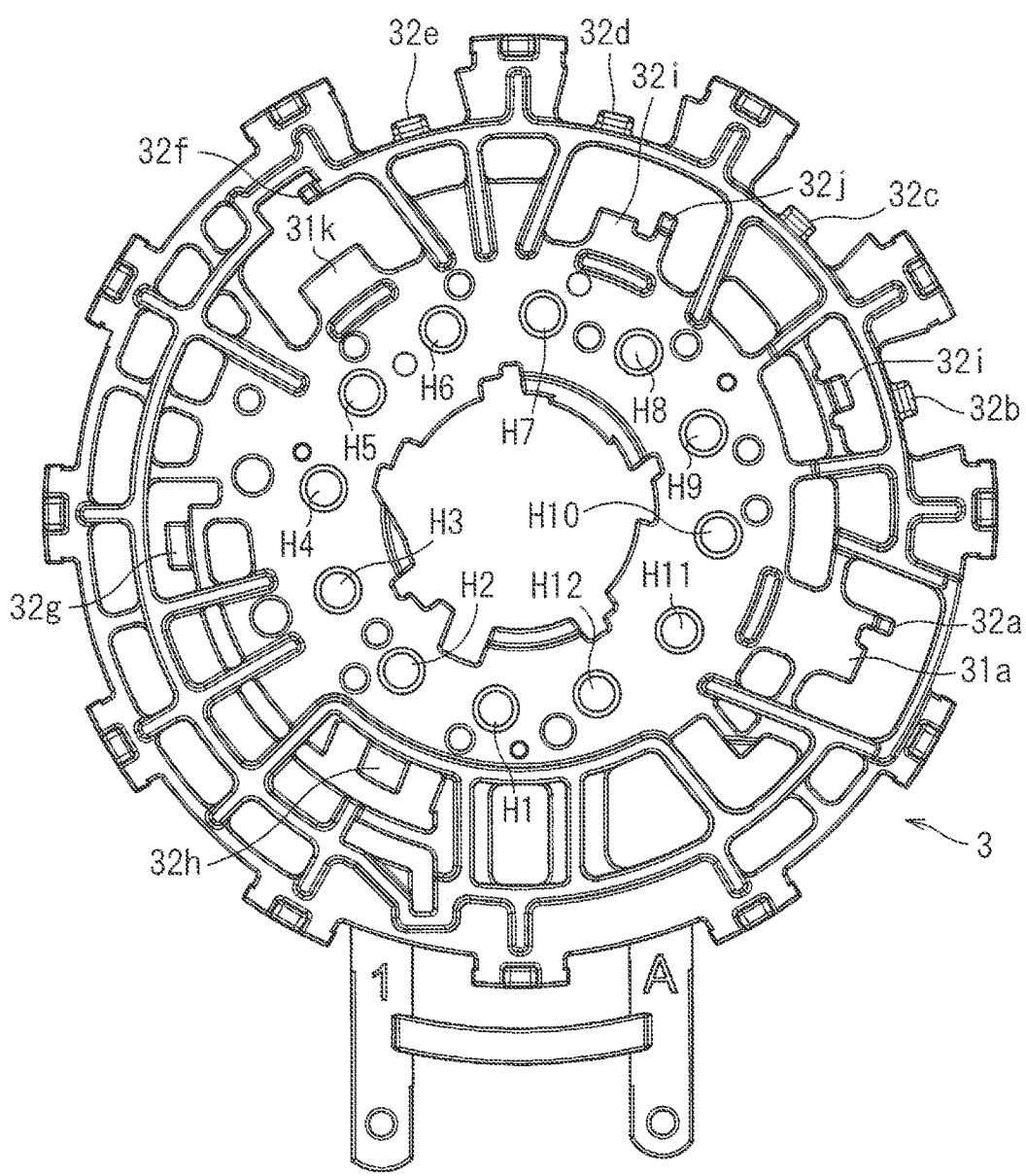
FIG. 4 is a rear view of the insulator for an armature.

FIGS. 3 and 4 are a front view and a rear view of the insulator 3 for an armature, respectively. The front surface of the insulator 3 for an armature shown in the front view is the surface visible in FIG. 1.

Figure 6:
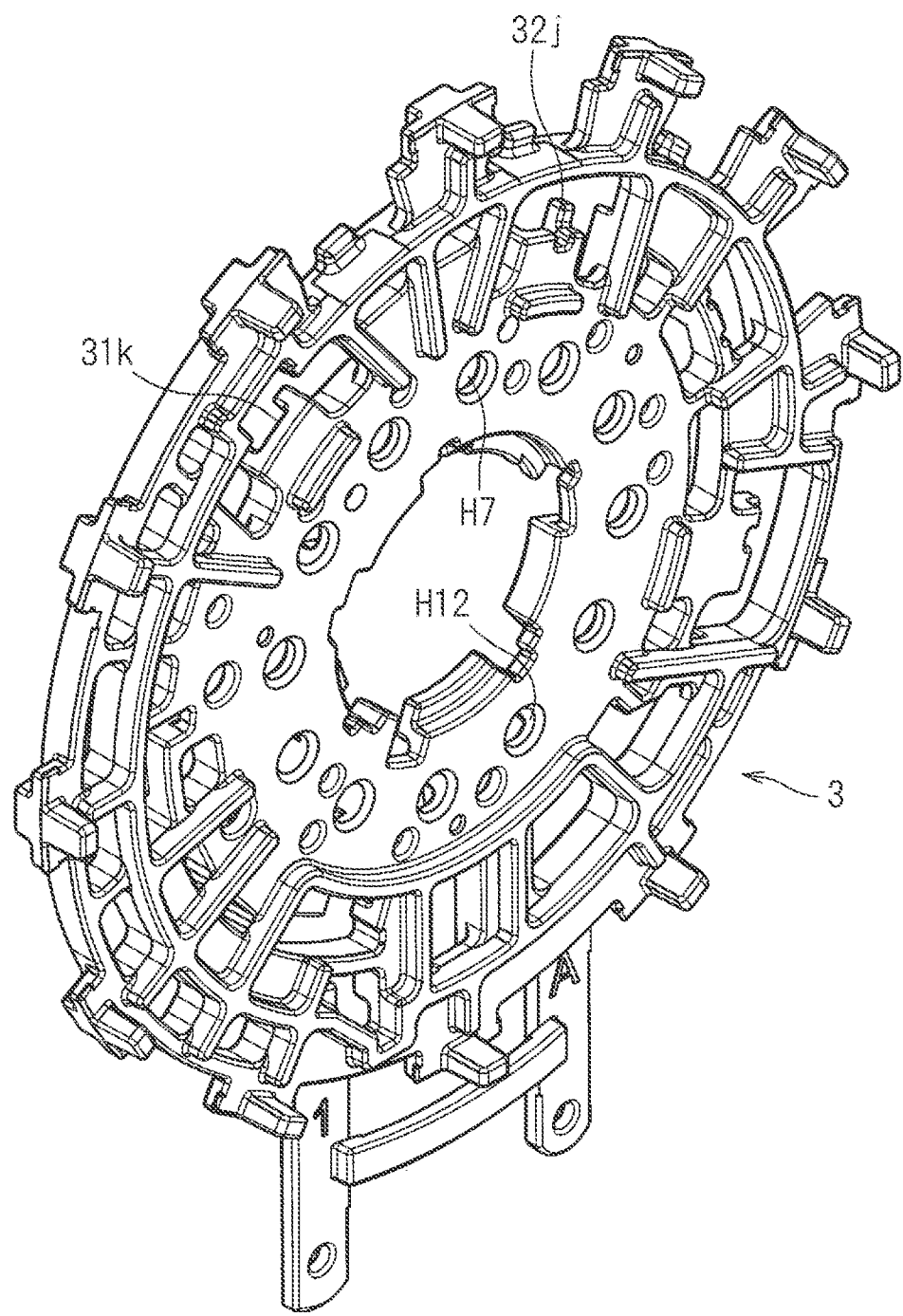
FIG. 6 is a perspective view of the insulator for an armature.

FIGS. 5 and 6 are perspective views of the insulator 3 for an armature, wherein FIG. 5 mainly shows the front surface of the insulator 3 for an armature and FIG. 6 mainly shows the rear surface of the insulator 3 for an armature.

If the base 31 of the insulator 3 for an armature satisfies the following three conditions, the abovementioned operations and effects are obtained, even if all of the ends (the parts visible in FIG. 1) of the coils Lu1 to Lu4, Lv1 to Lv4, and Lw1 and Lw4 in the axial direction J are covered. The three conditions are (i) penetration of the holes H1 to H12 penetrated by the pins Puas, Puae, Pwas, Pwae, Pvbs, Pvbe, Pubs, Pube, Pwbs, Pwbe, Pvas, and Pvae, (ii) an opening around the protrusion 31*a* that prevents the jumper line Pxv from being disengaged from the guide portion 32B, and (iii) openings around the protrusions 31*j* and 31*k* that prevent the jumper line Pxu from being disengaged from the guide portion 32A.

Note that, from the viewpoint of dissipating heat from the coils Lu1 to Lu4, Lv1 to Lv4, and Lw1 to Lw4, through-holes are formed, as appropriate, as shown in FIGS. 1 to 3 and 6.

Second Embodiment

In the present embodiment, the shape of an insulator 6 which is another insulator interposed between coils and teeth will be described.

Figure 7:
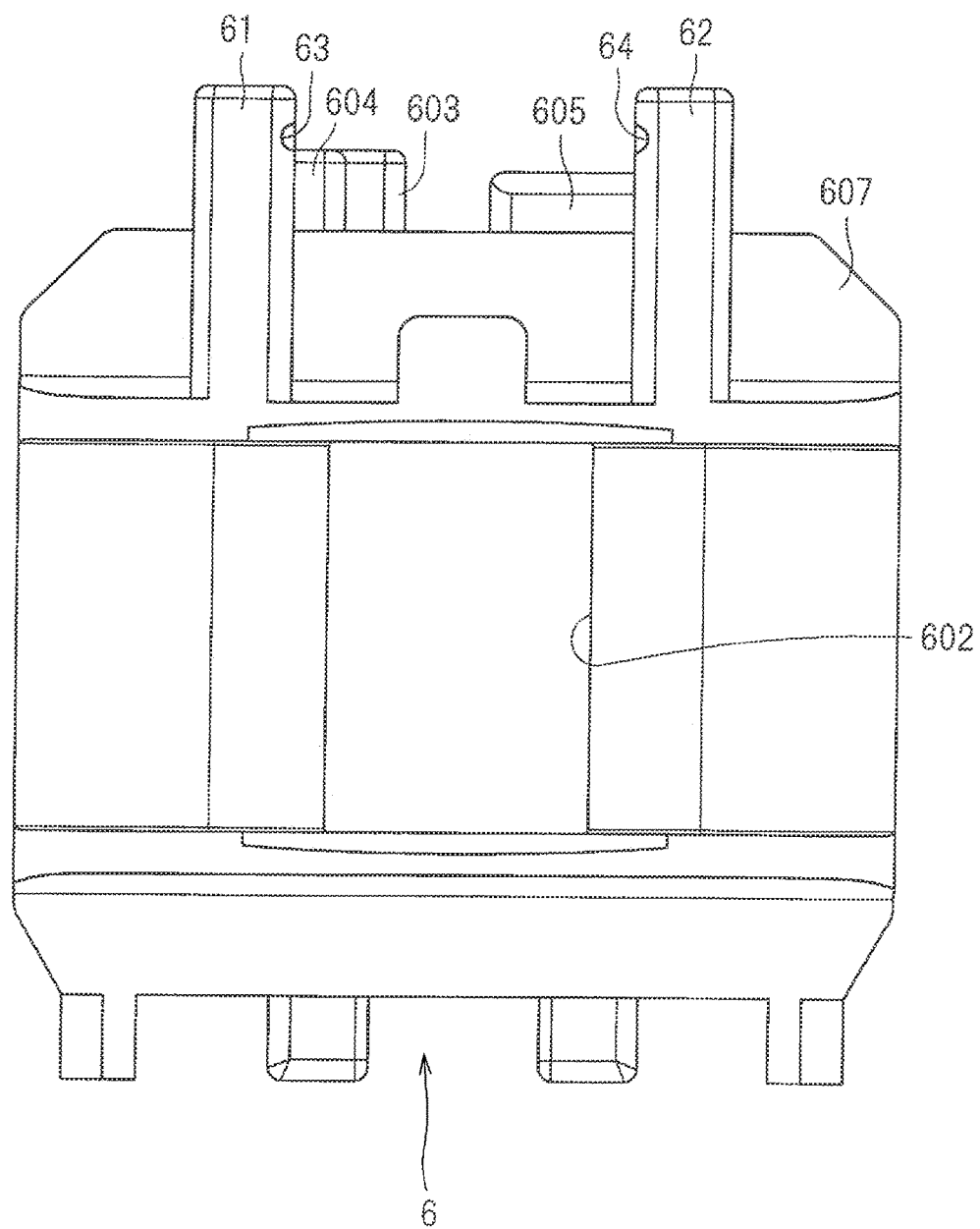
FIG. 7 is a front view of an insulator.
Figure 8:
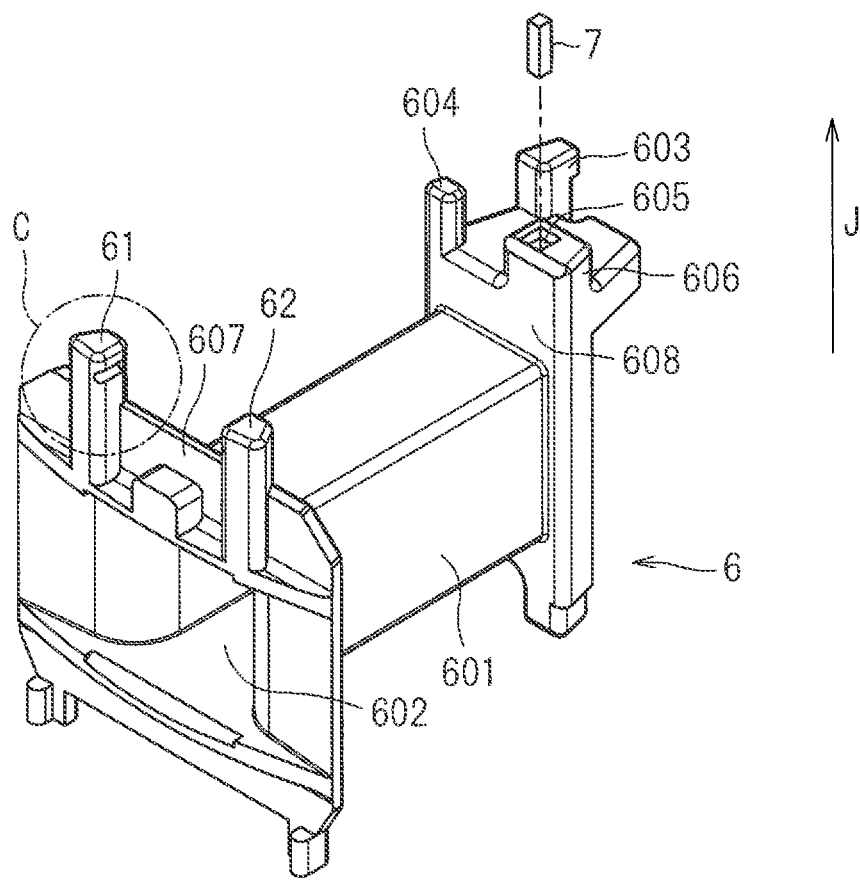
FIG. 8 is a perspective view of the insulator.

FIGS. 7 and 8 are a front view and a perspective view of the insulator 6, respectively. In FIG. 8, a pin 7 attached to the insulator 6 is also shown. The pin 7 is employed for the abovementioned pins Puas, Puae, Pwas, Pwae, Pvbs, Pvbe, Pubs, Pube, Pwbs, Pwbe, Pvas, and Pvae. Likewise, the illustrated insulator 6 can be applied as an object around which one of the coils Lu1 to Lu4, Lv1 to Lv4, Lw1 to Lw4 is wound.

Since the basic configuration of the insulator 6 is publicly known as disclosed in Japanese Patent Application Laid-Open No. 2016-27781, for example, it will be briefly described. The insulator 6 covers the tooth (for example, the tooth Tu1), and the coil (for example, the coil Lu1) is wound around the insulator 6. The insulator 6 has a plate 607 positioned on the outer peripheral side with respect to each tooth, a plate 608 positioned on the inner peripheral side with respect to each tooth, and a cylinder 601 around which a wire is wound between the plates 607 and 608. The cylinder 601 has an inner peripheral surface 602 on its inner side. The tooth is inserted into the inner peripheral surface 602.

The plate 608 is provided with protrusions 603, 604, and 606 that protrude in the axial direction J when the insulator 6 is provided to the armature. A hole 605 is formed in the protrusion 606, and the pin 7 is inserted in the hole 605. The protrusions 603 and 604 have a function to fix a wire that connects coils (for example, coils Lu1 and Lu2) forming a coil pair (for example, Lua) to each other while allowing the wire to be wound around the protrusions 603 and 604.

Although not described in detail in Japanese Patent Application Laid-Open No. 2016-27781, protrusions 61 and 62 protruding in the direction in which the protrusions 603, 604, and 606 protrude are provided on the plate 607. The protrusions 61 and 62 are on the outer peripheral side of the insulator 6 and fix the outer periphery of the insulator 3 for an armature so that the insulator 3 for an armature is fixed to the teeth Tu1 to Tu4, Tv1 to Tv4, and Tw1 to Tw4 in the radial direction via the insulator 6. Due to such fixation, even if an external force is applied to the insulator 3 for an armature, an influence of the external force on the pin is reduced and the effect of preventing the connection between the coils from being impaired is enhanced.

Figure 9:
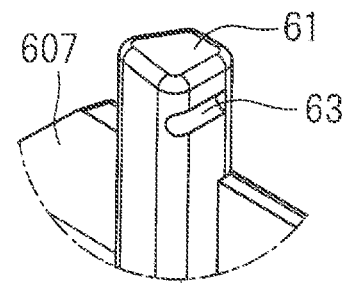
FIG. 9 is an enlarged perspective view of a part of FIG. 8.

FIG. 9 is an enlarged perspective view showing a part (an area indicated by a virtual sphere C) in FIG. 8. The protrusion 61 is provided with a groove 63 which opens toward the protrusion 62 and extends in the radial direction. Although not shown in FIG. 9, the protrusion 62 is similarly provided with a groove 64 which opens toward the protrusion 61 and extends in the radial direction (see FIG. 7).

Figure 10:
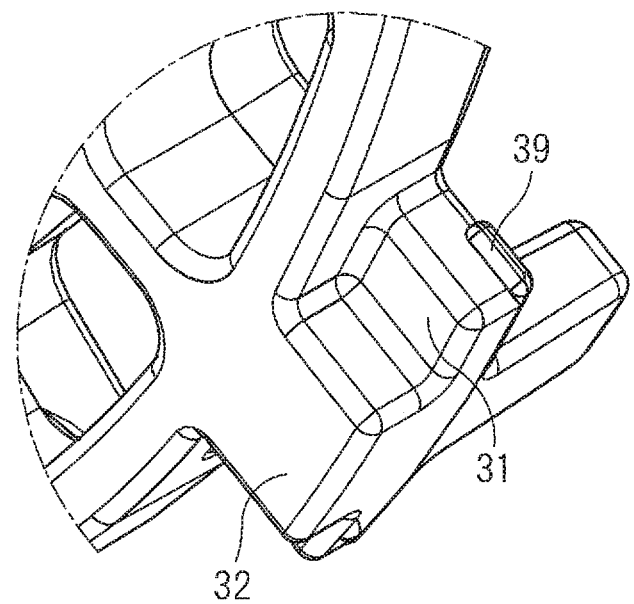
FIG. 10 is an enlarged perspective view of a part of FIG. 5.

FIG. 10 is an enlarged perspective view showing a part (an area indicated by a virtual sphere B) in FIG. 5. At the outer periphery of the insulator 3 for an armature, the base 31 locally protrudes to the outer periphery, and a protrusion 39 protruding in the circumferential direction is provided on the circumferential end as an engagement part. Although not shown in FIG. 10, the base 31 locally protruding toward the outer periphery is provided with a protrusion protruding in the circumferential direction on the circumferential end opposite to the protrusion 39.

The insulator 3 for an armature is fitted to the insulator 6 by the engagement between the protrusion and the groove 63 and the engagement between the protrusion 39 and the groove 64. Such engagement prevents the insulator 3 for an armature from separating from the insulator 6, and furthermore from the teeth Tu1 to Tu4, Tv1 to Tv4, and Tw1 to Tw4. That is, the insulator 3 for an armature is fixed in the axial direction J with respect to the coils Lu1 to Lu4, Lv1 to Lv4, and Lw1 to Lw4. Due to such fixation, even if an external force is applied to the insulator 3 for an armature, an influence of the external force on the pin is further reduced and the effect of preventing the connection between the coils from being impaired is further enhanced.

Third Embodiment

The present embodiment describes a mode of connection between a power supply line and a wire extending from a coil at a power supply pin.

FIG. 11 is a schematic diagram showing a mode for connecting a wire 5 and a power supply line 9 to the pin 7 serving as a power supply pin. Note that insulation coatings of the wire 5 and the power supply line 9 are peeled off at a portion adjacent to the pin 7.

With reference to the first embodiment, the pin 7 indicates the pin Pvas, the wire 5 indicates an opposite end of the wire constituting the coil Lv1 from the coil Lv2, and the power supply line 9 indicates the power supply line Cv. Alternatively, the pin 7 indicates the pin Puae, the wire 5 indicates an opposite end of the wire constituting the coil Lu2 from the coil Lu1, and the power supply line 9 indicates the power supply line Cu. Alternatively, the pin 7 indicates the pin Pwas, the wire 5 indicates an opposite end of the wire constituting the coil Lw1 from the coil Lw2, and the power supply line 9 indicates the power supply line Cw.

Normally, a wire having a larger cross-sectional area than a jumper line is used for the power supply line 9 (when a strand wire is used, a strand wire having a larger sum of cross-sectional areas is used). Therefore, winding the power supply line 9 around the pin 7 is not as easy as winding the jumper line around the pin 7. In view of this, in the present embodiment, one end of the power supply line 9 is disposed along the pin 7 around which the wire 5 is wound, and the one end and the wire 5 are bound to the pin 7 using another wire 8. In other words, at the pin 7, one end of the power supply line 9 and one end of the coil are targets to be bound to the pin 7 with the wire 8. Such binding makes it easy to fix the positional relationship with the coil. After such binding, the binding position is soldered.

As shown in FIG. 1, the power supply lines Cu, Cv, and Cw are laid on the side opposite to the coils Lv1, Lu2, and Lw2 with respect to the insulator 3 for an armature. Therefore, the insulator 3 for an armature is interposed between the binding positions and the coils in the axial direction J.

While the present invention has been described in detail, the foregoing description is in all aspects illustrative and not restrictive. It is therefore understood that numerous modifications and variations can be conceived of without departing from the scope of the present invention.

The invention claimed is:

1. An insulator for an armature in which a plurality of coils are annularly arranged and one ends of the coils are connected to pins which respectively correspond to the coils, the insulator being an insulator which is provided so as to align with the coils in an axial direction parallel to an axis of the armature and which guides three or more jumper lines that connect the coils with each other in a circumferential direction with respect to the axis, the insulator comprising:
a plurality of holes that is penetrated by the pins in the axial direction; and
a plurality of first guide portions that guide at least three of the jumper lines in the circumferential direction with respect to the axis at different positions in a radial direction around the axis.

2. The insulator for an armature according to claim 1, wherein the insulator is interposed between the coils and connection portions between the jumper lines and the pins in the axial direction.

3. The insulator for an armature according to claim 2, wherein at least one of the first guide portions has at least one protrusion protruding toward an outer periphery along the radial direction.

4. The insulator for an armature according to claim 3,
wherein at least one of the pins functions as a power supply pin to which one end of a power supply line is connected together with the one end of one of the coils, and
the insulator for an armature further comprises at least one second guide portion for guiding the power supply line in the circumferential direction.

5. The insulator for an armature according to claim 4, wherein the second guide portion has at least one protrusion protruding toward the outer periphery along the radial direction.

6. The insulator for an armature according to claim 5,
wherein, at the power supply pin, the one end of the power supply line and the one end of one of the coils are targets of clipping to the power supply pin with another wire, and
the insulator is interposed between the clipping position and the coil in the axial direction.

7. The insulator for an armature according to claim 4,
wherein, at the power supply pin, the one end of the power supply line and the one end of one of the coils are targets of clipping to the power supply pin with another wire, and
the insulator is interposed between the clipping position and the coil in the axial direction.

8. The insulator for an armature according to claim 2,
wherein at least one of the pins functions as a power supply pin to which one end of a power supply line is connected together with the one end of one of the coils, and the insulator for an armature further comprises at least one second guide portion for guiding the power supply line in the circumferential direction.

9. The insulator for an armature according to claim 8, wherein the second guide portion has at least one protrusion protruding toward the outer periphery along the radial direction.

10. The insulator for an armature according to claim 9, wherein, at the power supply pin, the one end of the power supply line and the one end of one of the coils are targets of clipping to the power supply pin with another wire, and the insulator is interposed between the clipping position and the coil in the axial direction.

11. The insulator for an armature according to claim 8, wherein, at the power supply pin, the one end of the power supply line and the one end of one of the coils are targets of clipping to the power supply pin with another wire, and the insulator is interposed between the clipping position and the coil in the axial direction.

12. The insulator for an armature according to claim 1, wherein at least one of the pins functions as a power supply pin to which one end of a power supply line is connected together with the one end of one of the coils, and the insulator for an armature further comprises at least one second guide portion for guiding the power supply line in the circumferential direction.

13. The insulator for an armature according to claim 12, wherein the second guide portion has at least one protrusion protruding toward the outer periphery along the radial direction.

14. The insulator for an armature according to claim 13, wherein, at the power supply pin, the one end of the power supply line and the one end of one of the coils are targets of clipping to the power supply pin with another wire, and the insulator is interposed between the clipping position and the coil in the axial direction.

15. The insulator for an armature according to claim 12, wherein, at the power supply pin, the one end of the power supply line and the one end of one of the coils are targets of clipping to the power supply pin with another wire, and the insulator is interposed between the clipping position and the coil in the axial direction.

16. The insulator for an armature according to claim 1, wherein one of the coils is wound around a second insulator, the insulator for an armature further comprises an engagement part to be engaged with the second insulator, and the insulator for an armature is fixed to the second insulator in the axial direction by engagement between the second insulator and the engagement part in the axial direction.

17. An outer rotor motor employing an armature which is constituted by the plurality of coils annularly arranged on the insulator for an armature according to claim 1.

* * * * *